March 4, 1930.　　　C. A. CAMPBELL　　　1,749,018
SLACK ADJUSTER
Filed July 17, 1925　　2 Sheets-Sheet 1
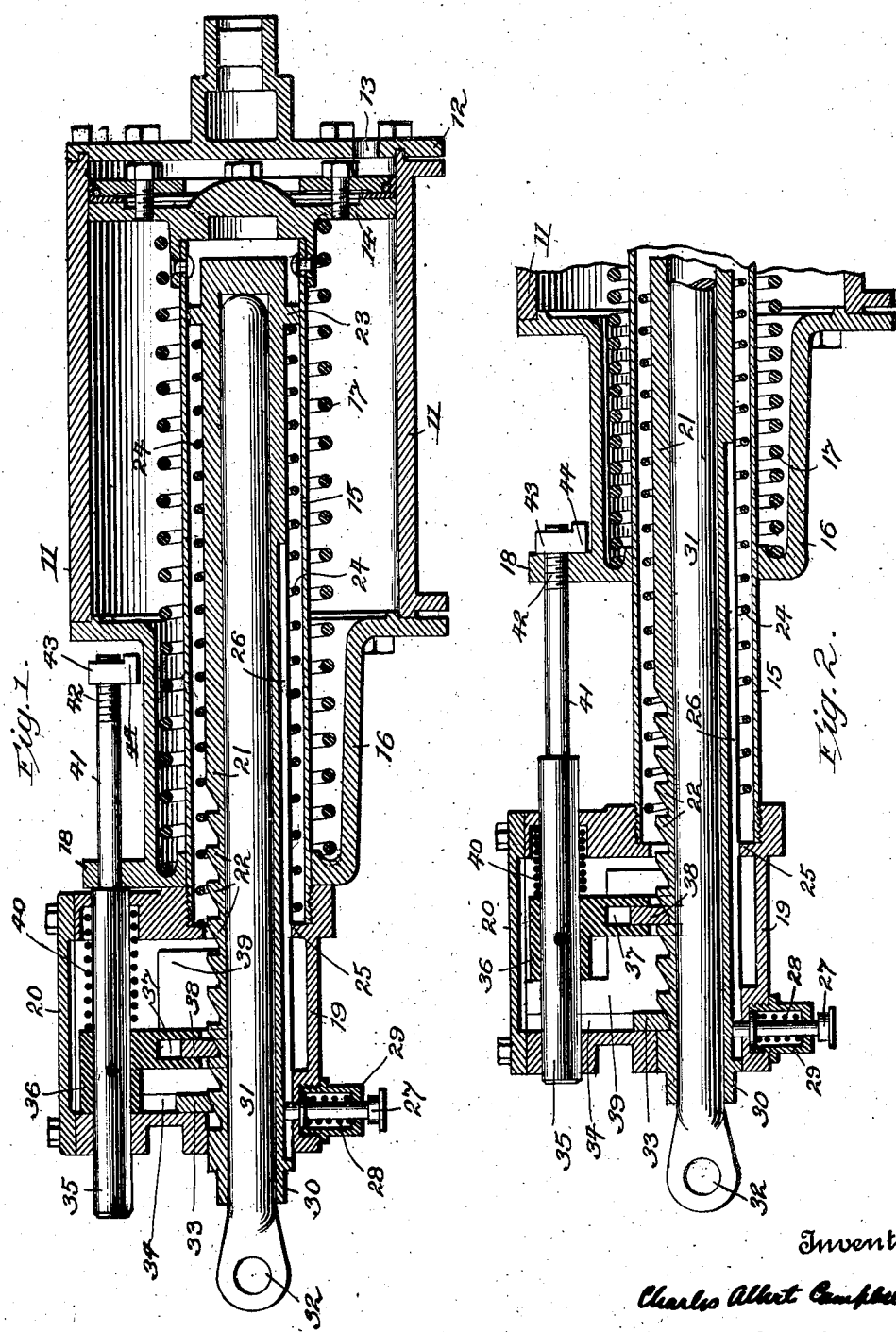

March 4, 1930. C. A. CAMPBELL 1,749,018
SLACK ADJUSTER
Filed July 17, 1925    2 Sheets-Sheet 2

Inventor
Charles Albert Campbell
By Dodge
Attorneys

Patented Mar. 4, 1930

1,749,018

UNITED STATES PATENT OFFICE

CHARLES ALBERT CAMPBELL, OF WATERTOWN, NEW YORK, ASSIGNOR TO THE NEW YORK AIR BRAKE COMPANY, A CORPORATION OF NEW JERSEY

SLACK ADJUSTER

Application filed July 17, 1925. Serial No. 44,303.

This invention relates to air brakes and particularly to slack adjusters of the mechanically actuated type.

Prior to my invention various structures have been devised for taking up the slack in brake rigging when the travel of the brake cylinder piston exceeds the normal distance. The mechanically actuated type, as contradistinguished from the pneumatically actuated type, has certain recognized advantages, but as heretofore constructed such slack adjusters have been cumbersome in their construction and have either imposed limitations on the arrangement of the foundation brake rigging or have included parts which extended along the side of the brake cylinder and hence were in the way and objectionable.

The slack adjuster of the present invention is mounted directly on the forward end of the tubular piston rod commonly used in air brakes and is quite simple and compact. It is available for use with conventional types of foundation brake rigging, requires only minor changes in the construction of any part of the brake cylinder, and hence is hightly desirable from a practical standpoint.

The device includes another feature of importance, namely a quickly and easily actuated device for re-setting the slack adjuster, i. e., letting out all the slack, as must be done, for example, when new brake shoes are applied. This resetting operation is performed almost instantly, a wrench being the only tool necessary. Furthermore, upon a single actuation of the brakes the slack is completely adjusted.

The preferred embodiment of the invention is illustrated in the accompanying drawings, in which Fig. 1 is a longitudinal axial section of the complete brake cylinder with the slack adjuster applied, the parts being shown in the position they assume before any slack has been taken up;

Fig. 2 is a fragmentary view similar to Fig. 1, showing the position assumed by the parts when the brake piston has moved out beyond its normal travel just far enough to set the parts so as to take up the slack by the amount of one tooth upon release of the brakes;

Figure 3:
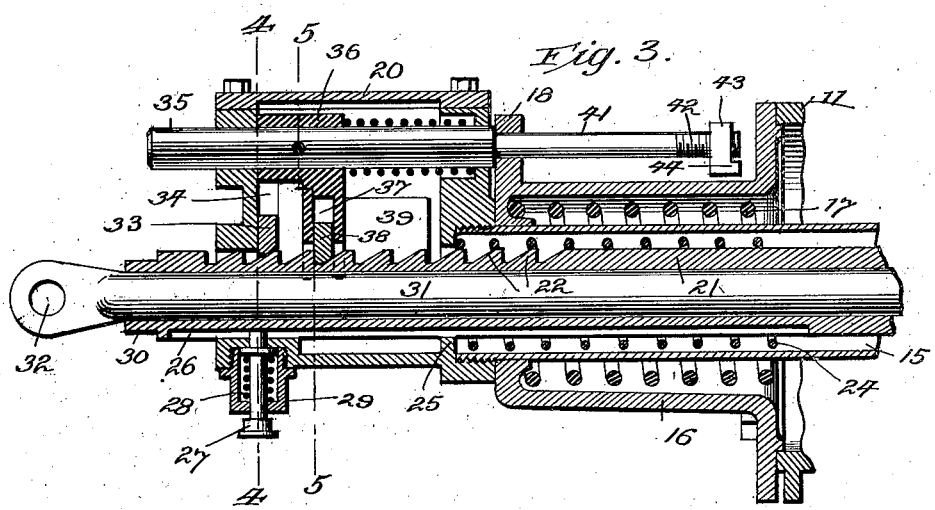
Fig. 3 is a view similar to Fig. 2, showing the position assumed by the parts when the brakes have been released after an over-travel such as is shown in Fig. 2.
Figure 4:
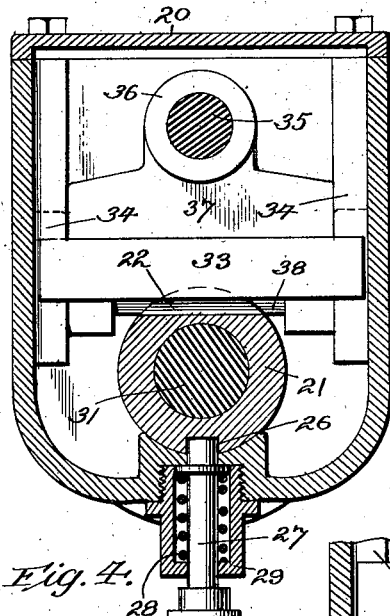
Fig. 4 is a section on the line 4—4 of Fig. 3.
Figure 5:
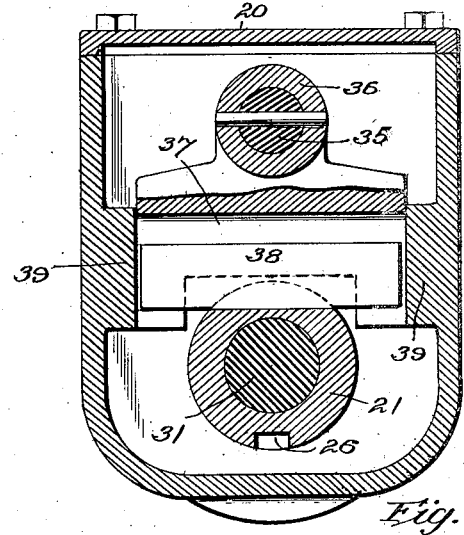
Fig. 5 is a section on the line 5—5 of Fig. 3.

The body of the brake cylinder is shown at 11, the pressure head at 12, and the port to which the air inlet connection (not shown) is made, at 13. Working in the cylinder body 11 is the usual piston 14 which carries a tubular piston rod 15 guided as usual in the front cylinder head 16. A spring 17 is used to return the piston 14 to its brake releasing position.

All the parts so far described are constructed and arranged in accordance with accepted standards in the brake art except that the tubular piston rod 15 is somewhat larger than usual and except that the head 16 is provided at its forward end with an upwardly projecting lug 18.

Threaded on the forward end of the tubular piston rod 15 is a housing 19 which forms a box-like space to which access may be had by the removal of a cover 20. Slidable within the tubular piston rod 15 and projecting forward through the forward end of the housing 19 is a round tubular ratchet bar 21 closed at its inner end and having ratchet teeth 22 formed on its upper side only. Near the inner end the ratchet bar 21 is provided with a peripheral flange 23 which serves first to guide the ratchet bar within the tubular piston rod 15, and second, as a spring seat for the re-setting spring 24 whose other end bears against an inwardly projecting flange 25 formed in the housing 19 and overhanging the end of the tubular piston rod 15. The spring 24 is known as the re-setting spring and its purpose is to shift the tubular ratchet bar 21 inward into the tubular piston rod 15 as far as it can go, unless the ratchet bar be retained in an outward position by one of the dogs hereinafter described.

Figure 6:
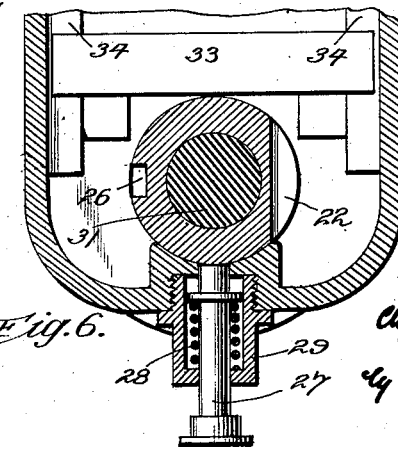
Fig. 6 is a view similar to Fig. 4, showing how the ratchet thrust rod is turned to allow the slack adjuster to re-set itself, releasing all the slack.

On its lower side the tubular ratchet bar 21 has a key-way or slot 26 which is engaged by the end of a plunger 27 urged inward into engaging direction by means of a coil spring 28. The coil spring 28 is mounted in a shell or housing 29 whose form is clearly shown in the drawings. The housing 29 is threaded into a recess in the lower side of the housing 19. The outer end of the tubular ratchet bar 21 is squared, as shown at 30. In order to release the ratchet teeth 22 from the retaining dogs the plunger 27 is withdrawn by hand and the tubular ratchet bar 21 is turned by a wrench applied to the squared portion 30. This position is shown in Fig. 6 and in such position the ratchet teeth 22 clear the dogs and the resetting spring 24 moves the tubular ratchet bar 21 into the tubular piston rod 15 to the limit of its motion.

In order to permit this rotation of the tubular ratchet bar 21 without requiring disconnection from the foundation brake rigging, the connection between the ratchet bar 21 and the foundation brake rigging is made by means of a thrust rod 31 whose inner end seats against the inner closed end of the ratchet bar 21 and whose outer end is provided with the usual eye 32 by means of which pivotal connection with the foundation brake rigging is made. This arrangement meets another requirement of the service, which is that when the brakes are applied by hand the thrust rod 31 is free to move outward relatively to the ratchet bar 21 and the tubular piston rod 15.

The main actuating connection between the piston rod 15 and the ratchet bar 21 is made by a dog 33 which is vertically slidable in guideways 34 formed in the inner walls of the housing 19. The dog 33 is in the form of a bevel edged bar which drops by gravity into engagement with the teeth 22.

The slack is taken up by a shiftable dog which, if the piston rod over-travels, is moved the space of one tooth or more. Upon the ensuing release of the brakes it shifts the ratchet bar 21 outward relatively to the piston rod 15 in opposition to the re-setting spring 24. This second ratchet mechanism comprises a rod 35 parallel with the piston rod 15 and slidable in guideways formed in the housing 19. The rod 35 carries a yoke 36 pinned or otherwise fixed thereon, which is forked as shown at 37. Guided in this forked portion is the take-up dog 38 whose ends are confined by cheek pieces 39 formed on the interior walls of the housing 19. The dog 38 is also a bevel edged bar and is gravity actuated.

The yoke 36 is urged to the left by a spring 40 surrounding the rod 35 which assists in taking up the slack against the opposition of the re-setting spring 24. The rod 35 is shouldered and has a reduced extension 41 which extends through an opening in the lug 18 on the forward cylinder head 16. The end of the rod 41 is threaded, as shown at 42, to receive a nut 43 which is formed with an extension 44 designed to serve as a pendent weight and prevent accidental rotation of the nut 43.

The operation of the slack adjuster is as follows: The nut 43 is so adjusted that the interval between the nut and the lug 18 equals the desired minimum travel of the brake piston. As this desired minimum travel is exceeded either because of wear of the brake shoes or because of excessive slack when the brake shoes are first applied, the nut 43 will collide with the lug 18, arresting the rod 41 and consequently arresting the dog 38. If the piston moves far enough the take-up dog 38 will over-run one or more of the teeth 22.

When the piston 14 thereafter starts to move inward, the spring 40 will shift the yoke 36 until motion is arrested by the engagement of the dog 38 with the last tooth 22 over-run. The parts are now in the position of Fig. 2. From then on the rod 35 stands at rest in the yoke 19 until the shoulder at the junction with the extension 41 collides with the lug 18. When this occurs, the continued movement of the piston inward will shift the tubular ratchet bar 21 outward relatively to the tubular piston rod 15, and the dog 33 will ride over the teeth 22 and stand in position to engage the last tooth which it over-rides. (See Fig. 3.) Upon the next application of the brakes the connection from the piston 15 to the ratchet bar 21 will be through the dog 33 and this newly engaged tooth, and in that way the requisite take-up of slack is effected in a single application of the brakes.

It should be observed that dogs 33 and 38 are not spaced apart in exact multiples of teeth in bar 21, but are offset. The offset is conveniently ½ tooth. If the dogs were spaced in exact tooth intervals the dog 33 would not engage freely.

It will be observed that the desired minimum travel of the brake piston may be adjusted by moving the nut 43. If new brake shoes have been applied to the car, all the slack is released by withdrawing the plunger 27 and turning the ratchet bar 21 by means of a wrench, as already described. This releases the ratchet teeth 22 from the dogs 33 and 38 and the spring 24 restores the parts to the position shown in Fig. 1. As soon as they have been so restored, the ratchet bar is turned back to its normal position and the plunger 27 is allowed to re-engage in the slot 26. Upon the first application of the brakes the slack will be properly adjusted for the new shoes.

It should be observed that the slack adjuster above described requires very little change in the forms of standard parts of the brake mechanism, and that it does not require any special connection with the foundation brake rigging or require any space additional to that ordinarily afforded for the brake cylinder.

What is claimed is:

1. The combination with an air brake cylinder unit including a tubular piston rod, of a ratchet thrust member in telescoping relation with said rod; a slack adjuster of the ratchet type supported by said rod and forming a self adjusted driving connection between said rod and thrust member; a second thrust member adapted for connection with brake rigging and in telescoping thrust relation with said ratchet thrust member, and said ratchet thrust member being rotatable relatively to said second thrust member and to said tubular piston rod; and releasable means for locking said ratchet thrust member against rotation.

2. The combination with an air brake cylinder unit including a tubular piston rod, of a slack adjusting mechanism carried by said rod. and including pawls and a ratchet toothed thrust member in telescoping relation with said rod, said member being rotatable in said rod to bring its teeth into and out of coactive relation with said pawls; and releasable means for retaining said member with its teeth in such coactive relation.

3. The combination with an air brake cylinder unit including a tubular piston rod, of a slack adjusting mechanism carried by said rod, and including pawls and a ratchet toother thrust member in telescoping relation with said rod, said member being rotatable in said rod to bring its teeth into and out of coactive relation with said pawls; releasable means for retaining said member with its teeth in such coactive relation; and a second thrust member in telescoping relation with the first thrust member, and itself adapted for connection with foundation brake rigging.

4. The combination with an air brake cylinder unit including a piston of a slack adjuster including a ratchet toothed bar and pawls shiftable by excess travel of said piston to take up slack; a mount for said bar arranged to permit it to be rotated on a longitudinal axis to carry its teeth out of and into coactive relation with said pawls; and releasable means for retaining said bar with its teeth in such coactive relation.

5. A slack adjuster comprising in combination a ratchet bar; a pawl carrier in adjustable relation therewith; a pawl in determined relation to said carrier and forming a driving connection between said carrier and bar for the transmission of braking stress; a second pawl in said carrier in a normal engaging position intermediate teeth on said bar when the first pawl is in engagement with a tooth on said bar and when engaged serving to move said bar in the same direction as the first pawl; means operable by excess braking travel for shifting said second pawl from said normal position; and means operated by a succeeding movement to release serving to restore said second pawl to a normal position.

6. The combination with an air brake cylinder including a tubuar piston rod; of a toothed bar in telescoping relation with said rod; a pawl carrier mounted on said rod; a pawl in determined relation with said carrier adapted to engage the teeth on said bar to establish an adjustable driving connection between said rod and bar; a second pawl movably mounted in said carrier; a stop limiting the movement of the second pawl when moved with said carrier whereby braking over-travel of said piston rod will shift said pawl relatively to said carrier and bar; and means operated by a succeeding releasing movement of said piston rod serving to shift said second pawl to normal position.

7. The combination with an air brake cylinder including a tubular piston rod; of a toothed bar in telescoping relation with said rod; a pawl carrier mounted on said rod; a pawl in determined relation with said carrier adapted to engage the teeth on said bar to establish an adjustable driving connection between said rod and bar; a second pawl movably mounted in said carrier in a normal position intermediate teeth on said bar when the first pawl is in engagement with a tooth on said bar; a stop limiting the movement of the second pawl when moved with said carrier whereby braking over-travel of said piston rod will shift said pawl relatively to said carrier and bar; and means operated by a succeeding releasing movement of said piston rod serving to shift said second pawl to normal position.

8. The combination with an air brake cylinder including a tubular piston rod, of a pawl carrier mounted on said rod; a pawl mounted on said carrier in a determined relation therewith; a second pawl movably mounted in said carrier; a stop limiting the movement of the second pawl when moved with said carrier, whereby braking over-travel of said piston rod will shift said pawl from its normal position relatively to said carrier; means operated by a succeeding releasing movement of said piston rod serving to shift said second pawl back to its normal position; a toothed bar in telescoping relation with said rod, said bar being rotatable from the normal position in which its teeth are engaged by said pawls to an abnormal position in which its teeth are free of said pawls; and means for retaining said bar in said normal position.

9. The combination with an air brake cylinder including a tubular piston rod, of a pawl carrier mounted on said rod; a pawl mounted on said carrier in a determined relation therewith; a second pawl movably mounted in said carrier; a stop limiting the movement of the second pawl when moved with said carrier, whereby braking over-travel of said piston rod will shift said second pawl from its normal position relatively to said carrier; means operated by a succeeding releasing movement of said piston rod serving to shift said second pawl back to its normal position; a tubular toothed bar, closed at its rear end, in telescoping relation with said rod, said bar being rotatable from the normal position in which its teeth are engaged by said pawls to an abnormal position in which its teeth are free of said pawls; means for retaining said bar in said normal position; and a thrust rod in telescoping relation with said bar and having means for establishing a connection with foundation brake rigging.

10. The combination with an air brake cylinder unit including a piston rod, of a slack adjuster supported directly by said rod and including a shiftable element; a motor spring for actuating said adjuster arranged to react between said rod and said shiftable element; and means for stressing said spring operable by the over-travel of said rod.

11. The combination of an air brake cylinder unit including a tubular piston rod, of a rotatable thrust member in telescoping relation with said rod; a slack adjuster of the ratchet type supported by said rod in co-active relation with said thrust member and including a shiftable ratchet member; a motor spring for actuating said slack adjuster arranged to react between said shiftable ratchet member and said rod; means for stressing said spring by the over-travel of said rod; and means for connecting said thrust member with brake rigging.

In testimony whereof I have signed my name to this specification.

CHARLES ALBERT CAMPBELL.